Sept. 17, 1935.	P. MACA	2,014,535
GLASS REPLACEMENT TOOL
Filed April 6, 1933
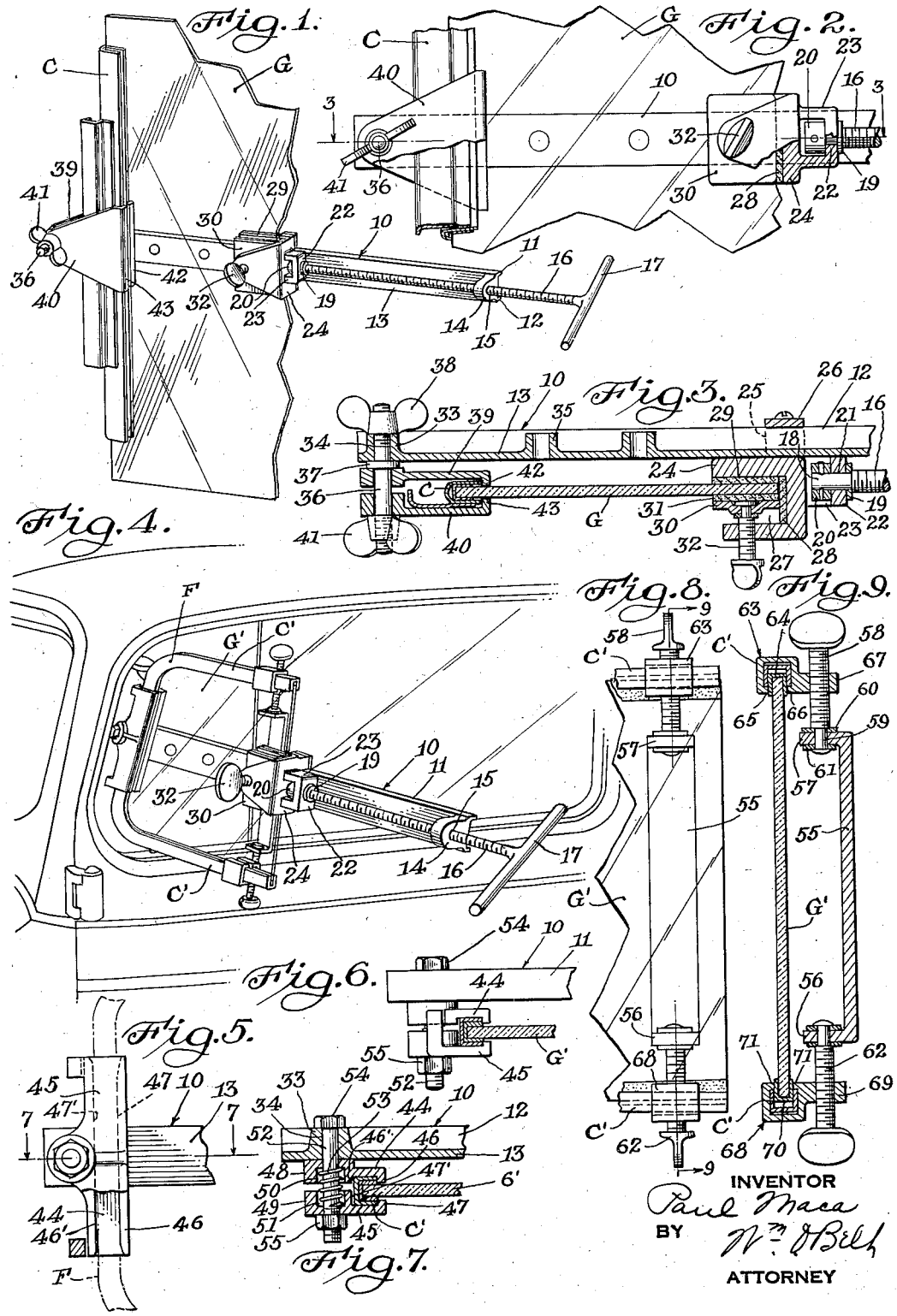
INVENTOR
Paul Maca
BY
Wm. J. Belt
ATTORNEY Patented Sept. 17, 1935

2,014,535

UNITED STATES PATENT OFFICE 2,014,535

GLASS REPLACEMENT TOOL

Paul Maca, Chicago, Ill., assignor to Sommer & Maca Glass Machinery Corporation, Chicago, Ill., a corporation of Illinois Application April 6, 1933, Serial No. 664,788

12 Claims. (Cl. 29—84)

This invention relates to glass replacement tools and particularly to tools for both installing and removing panes of glass.

The panes of glass of automotive vehicles and the like are usually bound on one or more edges with friction tape or other suitable material, and these edges are placed in a metal channel to be tightly held therein. A chisel has been used to remove glass so held when it has become necessary to do so but this has been found to be unsatisfactory because the work was slow and difficult and dangerous because of the flying chips of glass and the channels were often materially damaged. Therefore, one of the objects of my invention is to safely, quickly and easily remove panes of glass from channels in which one or more of the edges thereof are retained without damage to the channels.

When three edges of a substantially rectangular pane of glass are secured in a channel frame, removal of the pane is expedited by spreading the opposite portions of the channel frame, and therefore another object of my invention is to expand the opposite sides of a channel frame to facilitate removal of a pane of glass therefrom and an ancillary object is to compress the opposite sides of the channel frame onto the edges of a pane of glass installed in the frame to secure the glass tightly in the channel.

It is essential that panes of glass be evenly forced into channels in which one or more edges thereof are to be retained to avoid breaking the glass, and a further object of my invention is to force panes of glass into the channels of frames in which the edges are to be retained in a uniform even manner to thereby avoid breakage.

Further objects of the invention are to clamp a channel from which a pane of glass is to be removed or into which a pane of glass is to be inserted without damage to the channel; to afford adjustment in the tool so that panes of glass of different sizes may be handled thereby; to provide a tool which may be easily arranged in operative position; and to provide a tool of simple and economical construction and efficient and positive operation.

Selected embodiments of my invention are illustrated in the accompanying drawing wherein Fig. 1 is a perspective view illustrating one application of my tool;

Fig. 2 is a fragmentary side elevation, wherein certain parts are broken away, of the tool as illustrated in Fig. 1;

Fig. 3 is a sectional detail view taken substantially on the line 3—3 on Fig. 2;

Fig. 4 is a perspective view illustrating another application of my tool;

Fig. 5 is a detail view of the channel engaging clamp used with my tool as illustrated in Fig. 4;

Fig. 6 is a plan view of the clamp illustrated in Fig. 5;

Fig. 7 is a sectional detail view taken substantially on the line 7—7 on Fig. 5;

Fig. 8 is a side elevation of the channel frame spreading and compressing tool; and Fig. 9 is a detail view taken substantially on the line 9—9 on Fig. 8.

Referring to the drawing and more particularly to Figs. 1, 2 and 3, 10 indicates the arm of my tool which is in the form of a channel strip including flanges 11 and 12 and a flat intermediate web 13. A lug 14 extends outwardly from the bottom of the web 13 at one end of the arm and has a tapped hole 15 therein. A threaded rod 16 is passed through the tapped hole 15 and has a handle 17 at the outer end thereof. The inner end of the rod 16 is reduced, as indicated at 18, and thereby defines a shoulder against which the washer 19 rests. A collar 20 is pinned or otherwise suitably secured at the outer end of the reduced portion 18 after this reduced portion has been passed through the opening 21 in the web 22 of a substantially U-shaped boss 23 on the slide block 24, and in this way the block 24 is connected to the rod 16 to be movable along the arm 10 upon rotation of the rod, the connection of the rod to the web 22 permitting free rotation of the rod. Lugs such as 25 are provided at opposite edges of the slide block 24 and respectively engage the outer sides of the flanges 11 and 12. A strip 26 is secured to the outer ends of the lugs 25 to hold the block 24 against the outer side of the web 13 of the arm 10. When the handle 17 is grasped and the rod 16 is rotated it moves in and out through the tapped opening 15 to slide the block 24 along the arm 10.

The slide block 24 has a vertical bifurcation 27 therein. A pad 28 of fibrous material is mounted in the bottom of this bifurcation. A pad 29 of fibrous material is fast to the innermost side wall of the bifurcation 27. A clamp plate 30 is mounted in the bifurcation 27 opposite the pad 29 and carries a pad 31 of fibrous material on the inner face thereof. The clamp plate 30 is connected to the clamp screw 32 mounted in the block 24 and upon rotation of the clamp screw the block 30 is moved toward and away from the pad 29 to thereby clamp the marginal edge of a pane of glass G between the pads 29 and 31.

A boss 33 is provided on the arm 10 and projects outwardly from the web 13, between the flanges 11 and 12, at the end of the arm opposite the lug 14. A bore 34 is provided in the boss 33. If desired, bored bosses similar to the boss 33 may be provided at spaced intervals along the arm 10, such additional bosses being indicated by 35 in Fig. 3. By connecting the channel clamp devices either in the boss 33 or in one of the bosses 35 panes of glass of different sizes may be accommodated in the tool.

A stud 36 is provided which has a unitary collar 37 positioned substantially medially in the extent thereof. One end of the stud 36 is threaded and is freely passed through the bore 34, or the bore of one of the bosses 35, and a wing nut 38 is mounted thereon. By tightening the wing nut the collar 37 may be tightly clamped against the web 13 to thereby secure the stud 36 in the boss 33 or in one of the bosses 35. A bearing portion is provided on the stud 36 adjacent the collar 37 on which a pair of cooperating clamp jaws 39 and 40 are slidably mounted and the outer end of this stud is threaded to receive a wing nut 41. At corresponding ends of the clamp jaws 39 and 40 I provide inwardly directed flanges 42 and 43.

It is customary to secure one edge of the door glass of an automotive vehicle or the like in a channel carrier, one form of such a carrier being illustrated in the accompanying drawing. Usually the edge of the pane to be secured in the channel is bound with friction tape or other suitable material and this bound edge is tightly forced into the channel C of the carrier. If the door glass is broken, or it is desired for other reason to remove it from the channel of the carrier, my novel tool may be used in the following manner.

The jaws 39 and 40 are separated sufficiently to permit the channel to be disposed therebetween and then the jaws are moved toward each other by running the wing nut 41 inwardly. The flanges 42 and 43 are positioned to overlie the free edges of the channel C of the carrier and thus the pane of glass G extends between the flanges as illustrated in Fig. 3. After the jaws have been properly positioned, the stud is passed through the bore 34 or a bore in one of the bosses 35 and the wing nut is tightened to thereby connect the channel clamping devices to the arm 10. The rod 16 is then rotated to slide the block 24 inwardly toward the edge of the glass opposite that secured in the channel C and when the marginal section of this opposite edge of the glass is extended into the bifurcation 27, the screw 32 is manipulated to tightly clamp the glass between the pads 29 and 31. The handle 17 is then grasped and the rod 16 is rotated to move the block 24 away from the clamp jaws 39 and 40 and since the block is tightly clamped to the pane of glass, the edge thereof is pulled from the channel C.

The preferred manner of using the tool to remove such a pane of glass from a channel is to first connect the jaws 39 and 40 adjacent one end of the channel and then to manipulate the rod 16 so as to slightly free the edge of the glass. Then the jaws 39 and 40 are positioned farther along on the carrier and the rod 16 is again manipulated to free the edge of the glass, and this is carried out progressively along the length of the carrier until the glass has been entirely freed therefrom. Of course, if the channel is rather short in length, these successive operations may be eliminated and the jaws 39 and 40 may be located substantially medially along the channel C, as illustrated in Fig. 1 and after the pads 29 and 30 have been tightly clamped on the glass in alignment with the jaws 39 and 40, the rod 16 may be rotated to pull the edge of the glass out of the channel of the carrier.

Ventilators provided in the windows of automotive vehicles or the like include a substantially rectangular pane of glass having three edges thereof fast in the channel of a frame. Such a channel frame is illustrated in the accompanying drawing and is indicated by F in Fig. 4 and the pane of glass secured therein is indicated by G'. My tool is adapted to remove and install panes of glass G' in such frames. The construction adapted for such use is the same as that previously described with the exception of the channel clamping devices.

When the tool is to be used with a frame such as F, the stud 36 and the jaws 39 and 40 are replaced by a stud and pair of jaws of the kind illustrated in Figs. 5, 6 and 7 wherein a pair of elongated jaws 44 and 45 are shown which respectively include inwardly directed flanges 46 and 47. These jaws also have medially located bearing portions 48 and 49 recessed as indicated at 50 and 51. A stud 52 is passed through the bearing portions 48 and 49, and a spring 53 is disposed about this stud and has the ends thereof arranged in the recesses 50 and 51. This spring so acts on the jaws that the flanges 46 and 47 are urged toward each other and into engagement with the channel C' of the frame F that is disposed therebeween so that the free edges of the channel C' engage the flanges 46 and 47 and so that the web of the channel cooperates with the seats 46' and 47' in the jaws opposite the flanges 46 and 47. The stud 52 is preferably in the form of a bolt and is passed through the bore 34 or the bore in one of the bosses 35 so that the head 54 thereof engages the free end of the boss, and a nut 55 on the opposite end of the bolt is tightened to urge the jaws toward each other and into engagement with the outer face of the web 13 of the arm 10. After the channel C' has been clamped between the jaws 44 and 45, the opposite marginal edge of the pane of glass G' is tightly clamped between the pads 29 and 31 and then upon rotation of the rod 16 the pane of glass G' may be pulled from the channel C' of the frame F, the channel engaging the flanges 46 and 47 during this operation.

It will be noted that the frame F includes channels engaging opposite edges of the pane G'. I have found that removal of the plane G' from the frame F is expedited if these opposite channels of the frame, which are in the nature of legs, are spread away from the edges of the pane G' and to this end I provide a strip 55 having lugs 56 and 57 at opposite ends thereof. A screw 58 includes a reduced inner end portion 59 which defines a shoulder against which a washer 60 is rested. The reduced end portion 59 is passed through an opening in the lug 57 and the free end thereof is peened over to clamp a washer 61 between the peened end and one side of the lug 57, the washer 60 engaging the opposite side of the lug 57. In this way the screw 58 is rotatably connected to the lug 57. A screw 62 is similarly secured in the lug 56. A jaw 63 is provided which includes a groove 64 through which one leg of the channel C' of the frame F may be passed. Inwardly directed overhanging lips 65 and 66 are provided at the open face of the groove 64 to engage the free edges of the upper leg of the channel C' when it is passed into the groove 64. The jaw 63 includes a bearing portion 67 having a tapped opening therein through which the screw 58 is passed. A jaw 68 is provided which includes a bearing portion 69 having a tapped opening therein through which the screw 62 is extended and the jaw 68 includes a groove 70 in which the lower leg of the channel C' of the frame F is disposed and overhanging inwardly directed lips 71 and 71 are provided which engage the free edges of this leg of the channel C'. After the legs of the channel C' have been arranged in the grooves 64 and 70, the screws 58 and 62 are rotated and since the jaws 63 and 68 are held against rotation, these jaws move along the screws. When the screws are rotated in the proper direction, the jaws 63 and 68 move away from each other and by reason of the engagement of the overhanging lips with the free edges of the legs of the channel C', these legs are spread apart which facilitates withdrawal of the pane G' from the frame F when the rod 16 is moved outwardly.

After the pane G' has been removed from the frame F and it is desired to install another pane therein the edges of this new pane to be retained in the frame are bound with friction tape or similar material and the pane is started into the spread legs of the channel C' of the frame F. The new pane of glass is then tightly clamped between the pads 29 and 31 with the adjacent edge thereof in engagement with the pad 28 and the rod 16 is turned to move the block 24 inwardly whereupon the pane G is forced into the channel C' and during this operation the web of the channel engages the seats 46' and 47'. When the edge of the pane G' is seated in that part of the channel C' engaged by the jaws 44 and 45, the channel is properly positioned. Then the screws 58 and 62 are rotated to cause the jaws 63 and 68 to move inwardly whereupon the opposite legs of the channel C' are compressed onto the adjacent edges of the pane G'.

The channel clamping devices so engage a channel positioned therebetween and the arm 10 is so connected with these channel clamping devices that it extends parallel with the pane of glass to be installed or removed. Further, the glass clamping devices are carried by the block 24 which slides along the arm 10 and therefore movement of the glass clamping devices is parallel with the glass and therefore force is applied to the glass uniformly and evenly which avoids breakage thereof. This is quite important especially when a glass is being forced into a frame such as that indicated by F for it enables a uniform even push to be applied to the glass which avoids breakage. It is also important when glass is being removed from a channel since it avoids breakage thereof and permits the glass to be salvaged.

I have provided a glass replacement tool which may be used either in the installation or removal of panes of glass. The tool is light and easy to handle and may be expeditiously installed or removed by a single person. I provide different forms of channel clamping devices and in this way a universal tool is provided, for it can be used in connection with channels of different constructions and adapted for different purposes. The tool is so constructed that ample force is exerted to effect removal or installation of the glass. Moreover, I have provided a tool which may be used to spread or compress opposite legs of a frame which greatly facilitates installation and removal of a pane of glass from a frame.

While I have illustrated and described a selected form of my invention it is to be understood that this is capable of variation and modification and I therefore do not wish to be limited to the precise details set forth but desire to avail myself of such changes and alterations as fall within the purview of the following claims.

I claim:

1. In a tool adapted for use in the replacement of a pane of glass held in a channel frame, an arm, stationary clamping means including a pair of clamping jaws adapted to engage the channel frame on opposite sides of the pane of glass, means connecting said clamping jaws to said arm, movable clamping means adapted to receive said pane of glass and including means for tightly clamping said pane of glass therein, means slidably connecting said movable clamping means on said arm, and means for moving said movable clamping means along said arm relative to said stationary clamping means.

2. In a tool adapted for use in the replacement of a pane of glass which has the edges thereof retained in a channel frame that is somewhat rectangular in outline and includes an open side disclosing one edge of the pane of glass, an arm, stationary clamping means including a pair of clamping jaws adapted to engage the channel frame on opposite sides of the pane of glass at the side of said frame opposite the open side thereof, means connecting said jaws to said arm, movable clamping means adapted to receive a part of the pane of glass adjacent the closed edge and including means for tightly clamping said pane of glass therein, means slidably connecting said movable clamping means on said arm, and means having a mechanical advantage and connected to said movable clamping means for moving said movable clamping means along said arm relative to said stationary clamping means to thereby move said pane of glass relative to said frame.

3. In a tool adapted for use in the replacement of a pane of glass which has the edges thereof retained in a channel frame that is somewhat rectangular in outline and includes an open side disclosing one edge of the pane of glass, an arm, stationary clamping means including a pair of clamping jaws having parts adapted to engage the free edges of the channel frame on opposite sides of the pane of glass and having other parts adapted to engage the bight of the channel frame, said parts of said clamping jaws cooperating to firmly hold said frame therein against movement relative to said clamping jaws, means connecting said jaws to said arms, movable clamping means having a bifurcation therein adapted to receive a part of the pane of the glass adjacent the closed edge and including means for tightly clamping said pane of glass in said bifurcation, means slidably connecting said movable clamping means on said arm, and means having a mechanical advantage and connected to said movable clamping means for moving said movable clamping means along said arm relative to said stationary clamping means to thereby move said pane of glass relative to said frame.

4. In a glass replacement tool, an arm, stationary clamping means on said arm, movable clamping means on said arm, means slidably connecting said movable clamping means on said arm, means for moving said movable clamping means along said arm relative to said stationary clamping means, said stationary clamping means including a stud, a pair of clamping jaws mounted on said stud, means for connecting said stud to said arm, and means for urging said clamping jaws into clamping relation.

5. In a glass replacement tool, an arm, stationary clamping means on said arm, movable clamping means on said arm, means slidably connecting said movable clamping means on said arm, means for moving said movable clamping means along said arm relative to said stationary clamping means, said stationary clamping means including a stud, a pair of clamping jaws mounted on said stud, and means for urging said clamping jaws into clamping relation and for securing said stud to said arm.

6. In a glass replacement tool, an arm, stationary clamping means on said arm, movable clamping means on said arm, means slidably connecting said movable clamping means on said arm, means for moving said movable clamping means along said arm relative to said stationary clamping means, said stationary clamping means including a stud, a pair of clamping jaws mounted on said stud and including cooperating inwardly directed flanges, yieldable means positioned between said clamping jaws, and means for urging said clamping jaws into clamping relation and for securing said stud to said arm.

7. In a glass replacement tool, an arm, stationary clamping means on said arm, movable clamping means on said arm, means slidably connecting said movable clamping means on said arm, means for moving said movable clamping means along said arm relative to said stationary clamping means, said stationary clamping means including a stud, a pair of clamping jaws having inwardly directed cooperating flanges thereon and seats opposite said flanges, and means for urging said clamping jaws into clamping relation and for securing said stud to said arm.

8. In a glass replacement tool, an arm, stationary clamping means on said arm, movable clamping means on said arm, means slidably connecting said movable clamping means on said arm, means for moving said movable clamping means along said arm relative to said stationary clamping means, said stationary clamping means including a stud having a substantially medially located collar thereon, means cooperating with one end of said stud for connecting said stud to said arm with said collar in engagement with said arm, a pair of clamping jaws mounted on the other end of said stud, and means cooperating with said collar for urging said clamping jaws into clamping relation.

9. In a glass replacement tool adapted for use in connection with a glass retaining frame including opposite legs, an arm, stationary clamping means adapted to be connected to said frame intermediate said opposite legs, means connecting said arm to said clamping means, movable clamping means, means slidably connecting said movable clamping means on said arm, means for securing a pane of glass in said movable clamping means, and means for moving said movable clamping means along said arm relative to said stationary clamping means to move said pane of glass in said frame.

10. In combination, a tool having means engageable selectively against the inner or outer edges of one side of a three sided frame for holding a pane of glass, means on said tool for engaging a pane of glass in said frame at its free edge, and means cooperating with said glass engaging means for exerting a force on said glass in opposition to the resistance of said frame.

11. In combination, a tool having means engageable selectively against the inner or outer edges of one side of a three sided frame for holding a pane of glass, means on said tool for engaging a pane of glass in said frame at its free edge and substantially opposite said frame engaging portion, and means on said tool cooperating with said glass engaging means for exerting a force on said glass in opposition to the resistance of said frame to said frame engaging means, whereby to selectively remove or insert said glass with respect to said frame.

12. In combination, a tool having means engageable selectively against the inner or outer edges of one side of a three sided frame for holding a pane of glass, means on said tool for engaging a pane of glass in said frame at its free edge and substantially opposite said frame engaging portion, and means on said tool cooperating with said glass engaging means for exerting a force on said glass in opposition to the resistance of said frame to said frame engaging means, whereby to selectively remove or insert said glass with respect to said frame, said glass engaging means comprising a clamping member for the edge of said glass.

PAUL MACA.